United States Patent [19]

Washizuka et al.

[11] 4,213,035
[45] Jul. 15, 1980

[54] ELECTRONIC COMBINED PROTRACTOR AND CALCULATOR CAPABLE OF MEASURING LENGTH AND ANGLE OF AN OBJECT

[75] Inventors: Isamu Washizuka, Kyoto; Nobuyasu Kakutani, Yao, both of Japan

[73] Assignee: Sharp Kabushiki Kaisha, Osaka, Japan

[21] Appl. No.: 858,411

[22] Filed: Dec. 7, 1977

[30] Foreign Application Priority Data

Dec. 10, 1976 [JP] Japan ................................ 51/148880
Dec. 10, 1976 [JP] Japan ................................ 51/148881

[51] Int. Cl.$^2$ ........................ G06M 3/14; G01B 3/12
[52] U.S. Cl. ........................ 235/92 DN; 235/92 EV; 364/562
[58] Field of Search .......... 235/92 DN, 92 V, 92 EV, 235/92 Q; 364/559, 561, 562; 33/137 R, 140, 1 N, 1 PT, 1 AP, 149 J

[56] References Cited

U.S. PATENT DOCUMENTS

| | | | |
|---|---|---|---|
| 2,685,082 | 7/1954 | Beman et al. | 235/92 V |
| 2,955,283 | 10/1960 | Busch-Keiser | 235/92 V |
| 3,271,564 | 9/1966 | Rosenfeld et al. | 235/92 DN |
| 3,526,890 | 9/1970 | Malina et al. | 235/92 DN |
| 3,654,449 | 4/1972 | Boyce | 235/92 DN |
| 3,965,340 | 6/1976 | Renner et al. | 235/92 DN |
| 4,031,360 | 6/1977 | Soule | 235/92 DN |
| 4,039,805 | 8/1977 | Newell | 235/92 DN |
| 4,053,985 | 10/1977 | Spentzas | 33/1 N |
| 4,086,580 | 4/1978 | Schroeder | 235/92 V |

*Primary Examiner*—Joseph M. Thesz
*Attorney, Agent, or Firm*—Birch, Stewart, Kolasch & Birch

[57] ABSTRACT

An extensible tape member is provided for measuring a voluntary angle or for measuring length of an object. The extensible tape member may be pulled out of the housing of an electronic combined protractor and calculator in measuring either angle or length. A rotatory reel which accomodates and stores the extensible tape member therein is rotated in unison with the extension of the extensible tape member from its housing. A photo sensor is provided for detecting rotation of the rotatory reel and for providing counting signals corresponding to the rotation. One of two indexes is arranged on a frame of the rotatory reel while the other of the indexes is positioned on the lower half of the housing of the electronic combined protractor and calculator. When measuring angle, the two indexes should be attached to two lines defining the angle to be measured, respectively. One of the indexes is rotatably driven along with the extension of the extensible tape member, whereby the rotatory reel is rotated in accordance with a degree of the angle to be measured. The counting signals are introduced into a control circuit to determine the degree of the angle. When measuring the length, the extensible tape member is adjusted in length to correspond to the length of the object to be measured while extending out of the housing. The rotation of the rotatory reel is utilized for determining the length of the object in almost the same manner as for the angular measurement.

23 Claims, 9 Drawing Figures

ELECTRONIC COMBINED PROTRACTOR AND CALCULATOR CAPABLE OF MEASURING LENGTH AND ANGLE OF AN OBJECT

BACKGROUND OF THE INVENTION

The present invention relates to a protractor for measuring a voluntary angle and, more particularly, an electronic combined protractor and calculator which can be used for measuring a voluntary angle and length of an object with a tape member extensible out of the housing thereof.

A prior art protractor was disclosed in U.S. Pat. No. 3,996,670 "PROTRACTOR WITH DIGITAL READOUT" issued on Dec. 14, 1976. The protractor was a type of a propeller protractor for measuring a blade angle of blades. In other words, a voluntary angle except for the blade angle could not be measured using the above protractor. A protractor which can measure any angle of an object is most preferable.

OBJECTS AND SUMMARY OF THE INVENTION

Accordingly, an object of the present invention is to provide a novel electronic combined protractor and calculator which is used for measuring a voluntary angle appearing on the surface of an object.

Another object of the present invention is to provide a novel electronic combined protractor and scale which is operable for measuring any angle emerging on the surface of an object and for measuring the length of the object.

Still another object of the present invention is to provide a novel electronic combined protractor and scale which is operable for measuring any angle of an object and for measuring the length of the object and for manipulating stored information introduced through numeral keys under commands directed by command keys included within a keyboard formed thereon.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, an extensible tape member is provided for rotating a rotary reel which stores the extensible tape member, the rotation of the rotary reel being detected by a photo sensor. In measuring a degree of a voluntary angle, two indexes are attached in agreement with two angle defining lines. One of the indexes is provided on the lower half of the electronic combined protractor and calculator, and the other of the indexes is arranged on a frame of the rotary reel. The one of the indexes defines a start line in measuring the degree of the angle. The other of the indexes functions to determine the degree of the angle spaced from the start line before being fitted to the other side line of the angle. The other of the indexes is rotated in unison with the rotatory reel the index being rotated by virtue of the extension of the extensible tape member from the housing. Operator can observe the two indexes through a transparent index window formed within the housing of the electronic combined protractor and scale. Rotation of the rotatory reel is detected by a photo sensor comprising a light emitting element and a light receiving element to thereby provide counting signals corresponding to the extension of the extensible tape member. The counting signals are introduced into a control circuit and manipulated therein to identify the angle. Control signals are provided by the control circuit for visually showing values of the angle.

In measuring the length of an object, the extensible tape member is attached to the object after extension out of the housing of the electronic combined protractor and scale. The rotatory reel rotates in unison with the extensible tape member and the photo sensor detects the rotation of the rotatory reel to thereby provide counting signals corresponding to the amount of the extensible tape member extended from the housing. The counting signals are introduced into the control circuit and manipulated therein to determine the length. Control signals are provided by the control circuit for visually showing the amount of the length of the object being measured.

In another embodiment of the present invention, the rotatory reel comprises a spur wheel means which is engaged with another spur wheel means of which the end portion partially appears outside the housing of the protractor. The one of the indexes is disposed on the lower half of the electronic combined protractor and scale and the other of the indexes is arranged on the spur wheel means. In measuring the angle, operator drives the another spur wheel means by rotating the spur wheel means until the other of the indexes is fitted to another side of the angle. The rotation of the spur wheel means is sensed by the photo sensor and the counting signal is developed in response to the rotation of the spur wheel means. The control circuit receives the counting signal and provides the control signal after manipulating the counting signal therein. The display visually indicates the degree of the angle in accordance with the control signal.

The electronic protractor of the present invention also functions as the well-known electronic calculator which calculates numeral information in response to the actuation of any digit key or keys on the keyboard, said calculations proceeding through the activation of a command key for directing the electronic calculator to manipulate the information. Details of the calculator are, for example, disclosed in U.S. Pat. No. 3,892,957 entitled "DIGIT MASK LOGIC COMBINED WITH SEQUENTIALLY ADDRESSED-MEMORY IN ELECTRONIC CALCULATOR CHIP", issued on July 1, 1975 and assigned to Texas Instruments Inc.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE PREFERRED EMBODIMENTS

Figure 1:
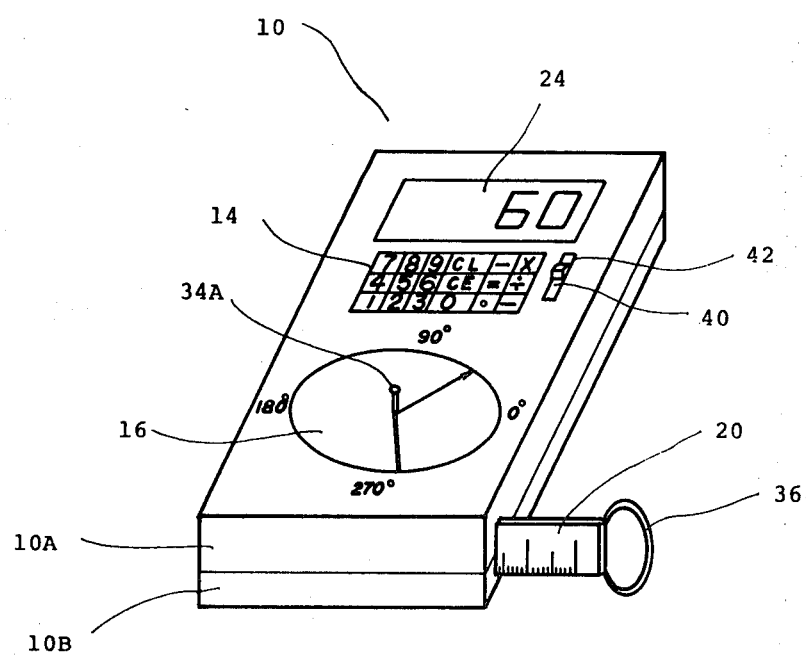
FIG. 1 is a perspective view of an embodiment of an electronic combined protractor and calculator of the present invention.
Figure 2:
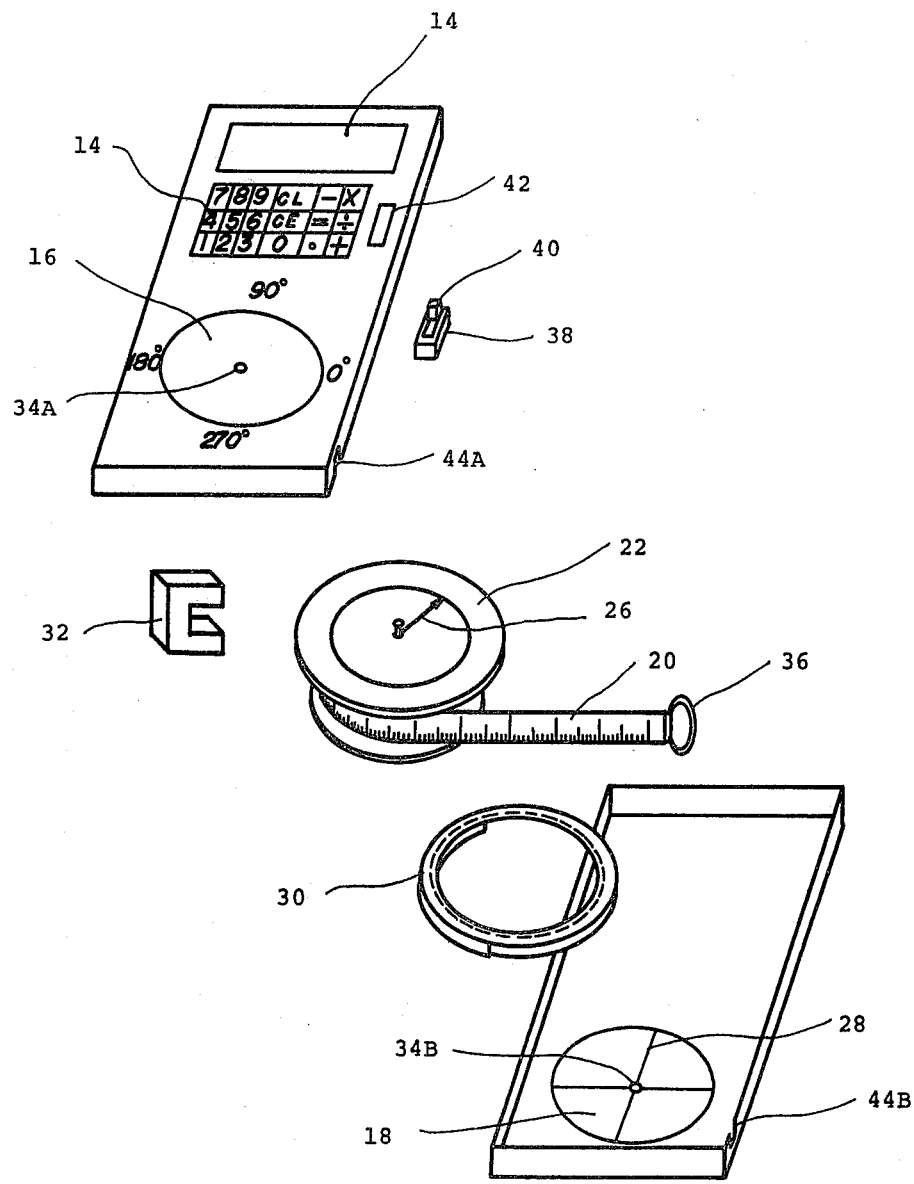
FIG. 2 is an exploded view of the electronic combined protractor and calculator shown in FIG. 1.

FIG. 1 shows an electronic combined protractor and calculator 10 of the present invention in a perspective view, and FIG. 2 illustrates the same in an exploded view.

The electronic combined protractor and calculator 10 mainly comprises an upper half 10A and a lower half 10B, the upper half having a display window 12, a keyboard 14, and an upper index window 16 and the lower half 10B including a lower index window 18. An extensible tape member 20 and a rotatory reel 22 are provided within the electronic combined protractor and calculator 10. A digital display 24 is provided for visually indicating a degree of an angle to be measured. The display 24 is disposed on a frame of the rotatory reel 22 and index lines are arranged on the lower index window 18. The index arrow 26 stands at the same position as the index line 28 when viewing it in an elevational view, for providing the initial position thereof, when the index arrow 26 is not driven, that is, angle measurement of the electronic combined protractor and calculator 10 has not been performed yet. A spring 30 is provided for always forcing the extensible tape member 20 backward into the housing of the electronic combined protractor and calculator 10. The extensible tape member 20 is stored in the rotatory reel 22 when measurent of the angle is not performed.

The rotatory reel 22 and the spring 30 are packaged within the housing of the electronic combined protractor and calculator 10. A photo sensor 32 is provided for detecting the rotation of the rotatory reel 22 and for providing counting signals corresponding to an amount of the rotation of the rotatory reel 22. The photo sensor 32 comprises two couples of a light emitting element and a light receiving element. A plurality of slits are formed at the periphery of the rotatory reel 22. Light beams developed from the light emitting element are transmitted from the slits and are detected by the light receiving element to thereby sense the rotation of the rotatory reel 22.

The lower window 18 formed in the lower half 10B is transparent and made of glass material, for example. The upper index window 16 formed in the upper half 10A is also transparent and made of glass, material, for example. A bearing 34B is disposed at the center of the lower window 18 for supporting a transparent shaft of the rotatory reel 22. The position of the bearing 34B defines an orgin for rotating the index arrow 26 until the index arrow 26 is coincident with one side of the angle to be measured, wherein the index line 28 stands at another side of the angle.

A ring 36 is attached to the end of the extensible tape member 20 to prevent the extensible tape member 20 from being completely pulled in the housing of the electronic combined protractor and calculator 10. A selection switch 38 is provided within the housing of the electronic combined protractor and calculator 10 for selecting the measurement function of the electronic combined protractor and calculator 10, that is, either angle or length measurements. The angle measurement is performed through the use of the index line 28 and the index arrow 26.

The length measurement is achieved through attachment of the extensible tape member 20 to an object of which the length is to be measured, wherein the extending amount of the extensible tape member 20 is related with the number of rotations of the rotatory reel 22.

An actuator 40 of the selection switch 38 appears on the upper half 10A through a window 42 formed on the upper half 10A. Some symbols of angular amounts such as zero degree, ninety (90) degrees, one-hundred eighty (180) degrees, and two-hundred seventy (270) degrees are indicated on the upper half 10A around the upper index window 16. A bearing 34A is positioned at the center of the upper index window 16 for supporting the shaft of the rotatory reel 22 together with the bearing 34B formed on the lower index window 18. Two grooves 44A and 44B are formed at the peripheries of the upper half 10A and the lower half 10B, respectively. The extensible tape member 20 travels through an opening formed by the two grooves 44A and 44B.

Circuit means which receives the output of the photo sensor 32 are included within the housing of the combined electronic protractor and calculator 10, although the circuit means are not illustrated in FIG. 2 for convenience.

The angle measurement of the electronic combined protractor and calculator 10 is completed as follows.

The selection switch 38 is set in an angle measurement mode through operation of the actuator 40. The bearing 34B is attached to the origin of the angle to be measured. The index line 28 is fitted to one of two angle defining side lines. The index arrow 26 is further fitted to another of the two side lines by the rotation of the rotatory reel 22, the reel rotating in response to extension of the extensible tape member 20 from its housing. The rotation of the rotary reel 22 is detected by the photo sensor 32, whereby the degrees of the angle to be measured are indicated by the amount of rotation of the rotatory reel 22. The photo sensor 32 develops counting signals corresponding to the amount of rotation of the rotatory reel 22.

The length measurement of the electronic combined protractor and calculator 10 is also performed as follows.

The selection switch 38 is set in a length measurement mode through operation of the actuator 40. The extensible tape member 20 is attached to an object and pulled out of the housing of the electronic combined protractor and calculator 10. The length of the object is determined by amount of the extended length of the tape member 20 pulled out of the housing of the combined protractor and calculator 10. The rotatory reel 22 rotates in accordance with the extension of the extensible tape member 20. The photo sensor 32 detects the rotation of the rotatory reel 22 and provides counting signal corresponding to the amount of the rotation of the rotatory reel 22.

When the selection switch 38 is set in the calculation mode, the combined electronic protractor and calculator functions as a well-known calculator as described above through the use of the keyboard 14 comprising numeral keys and function keys, although a specific circuit for the calculator is not illustrated in the drawing for convenience sake.

Figure 3:
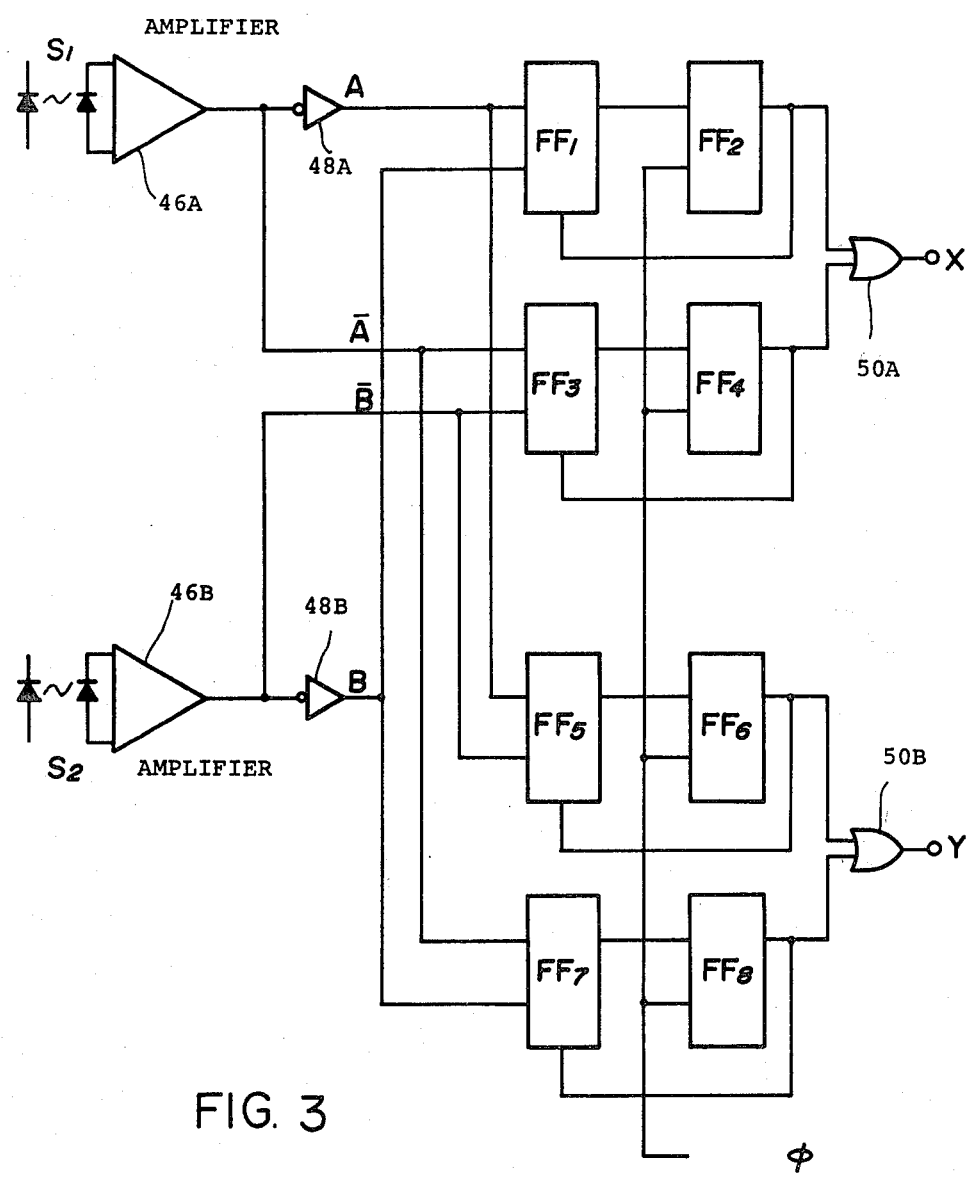
FIG. 3 is a circuit diagram of a detection circuit included within the electronic combined protractor and calculator of FIG. 1.

FIG. 3 shows a detection circuit for receiving the counting signal developed from the photo sensor 32 and determining whether the counting signal is count-up information or count-down information. The count-up information is related to forward rotation of the rotatory reel 22 and is responsive to further extension of the extensible tape member 26 when pulled out of the housing and the count-down information is associated with backward rotation of the rotatory reel 22 vice versa.

The detection circuit comprises photo sensors S1 and S2, amplifiers 46A and 46B, inverters 48A and 48B, D-type flip-flops FF1 through FF8, and OR gates 50A and 50B. The photo sensor 32 comprises two photo sensors S1 and S2 which provide the counting signals, respectively. The counting signal developed from the photo sensor S1 has a 90° phase difference from the same generated from the photo sensor S2. The counting signals are developed through the arrangement of the two photo sensors S1 and S2, wherein the photo sensors S1 and S2 depart from each other at an interval of one-half of the scale of the photo sensor S1 and S2. The output of the photo sensor S1 and S2 are introduced into the amplifiers 46A and 46B, respectively. The amplifiers 46A and 46B function to amplify and shape the outputs.

The amplifier 46A provides a signal $\overline{A}$ as the output thereof which is introduced into the inverter 48A to provide a signal A as the output thereof. The amplifier 46B provides a signal $\overline{B}$ as the output thereof which is entered into the inverter 48B to develop a signal B as the output thereof. The flip-flop FF3 receives the signals $\overline{A}$ and $\overline{B}$ and the flip-flop FF5 accepts the signals $\overline{A}$ and $\overline{B}$. The signals $\overline{A}$ and B are introduced into the flip-flop FF7. A clock signal $\phi$ is introduced into the flip-flops FF2, FF4, FF6, and FF8, respectively. The outputs of the flip-flops FF6 and FF8 are entered into the OR gate 50B to thereby develop a count-down signal Y.

Figure 4:
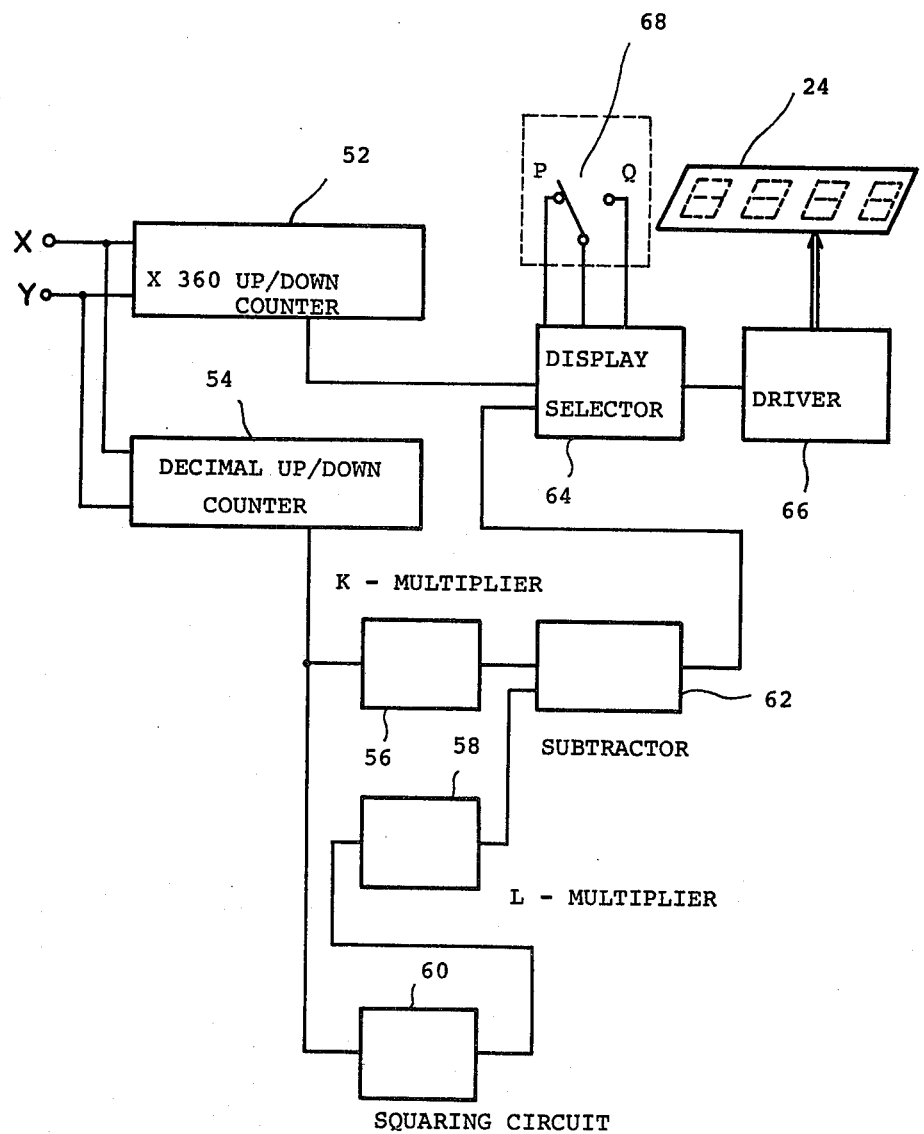
FIG. 4 is a block diagram of a control circuit employed within the electronic combined protractor and calculator of FIG. 1.

FIG. 4 shows a control circuit for developing a control signal to show the results of the measurement operations of the combined electronic protractor and calculator 10.

The control circuit comprises two up/down counters 52 and 54, a K-multiplier 56, an L-multiplier 58, a squaring circuit 60, a subtractor 62, a display selector 64, and a driver 66. The up/down counter 52 has the radix of three hundred sixty (360) and the up/down counter 54 is a decimal counter. The up/down counters 52 and 54 function to count the count-up signal X and the count-down signal Y. The multiplier 56 is used to multiply the output of the decimal up/down counter 54 by a constant K. The squaring circuit 60 raises the output of the decimal up/down counter 54 to second power. The output of the squaring circuit 60 is introduced into the L-multiplier 58 so that the L-multiplier 58 functions to multiply the output by a constant L.

The subtractor 62 operates to subtract the output of the L-multiplier 58 from the output of the K-multiplier 56. The display selector 64 is used to select which one is introduced into the driver 66 from the outputs of the x 360 up/down counter 52 and the Decimal up/down counter 54. The display selector 64 is energized by a switch 68 which is related to the selection switch 38 shown in FIG. 2. The driver 66 functions to operate the multi-digit display 24.

Figure 5:
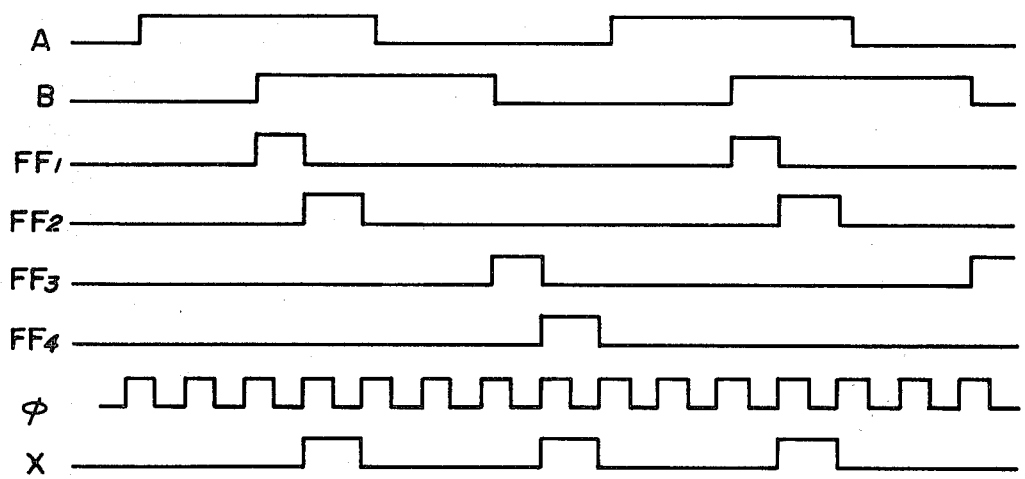
FIGS. 5(A) and 5(B) are wave signals occurring within the detection circuit of FIG. 3.
Figure 5:
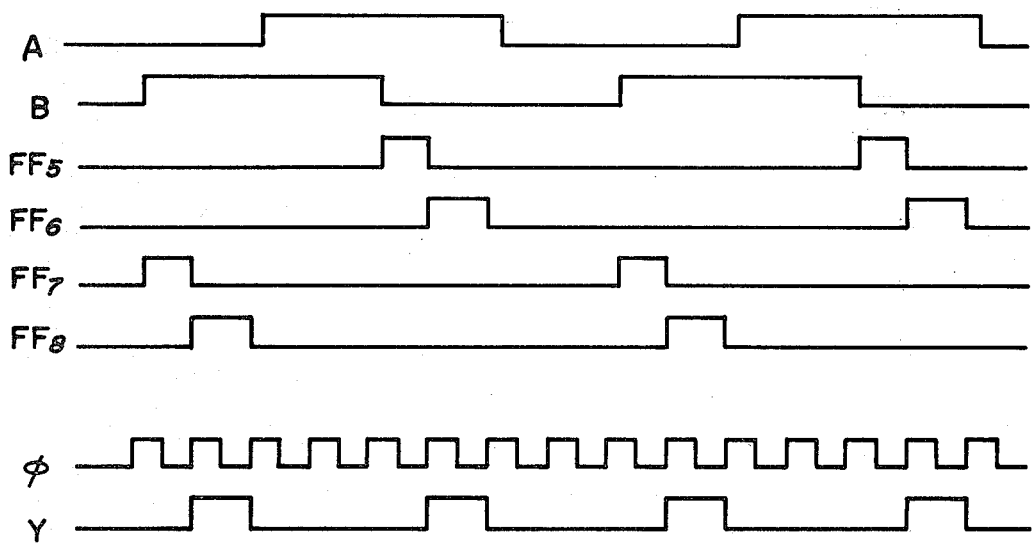

FIGS. 5(A) and 5(B) show time charts occurring within the detection circuit shown in FIG. 3, wherein FIG. 5(A) illustrates the time chart of the count-up information and FIG. 5(B) is the time chart of the count-down information.

Manipulation operations in the detection circuit of FIG. 3 and the control circuit of FIG. 4 are achieved in order to determine the amounts of the angle and the length measurements as follows, (referring to the time charts shown in FIGS. 5(A) and 5(B)).

In measuring the amount of the angle, the index arrow 26 and the index line 28 are fitted to the two sides of the angle, whereby rotatory reel 22 is forward rotated in unison with the pulling-out motion of the extensible tape member 20 thereby energizing the photo sensors S1 and S2. That is, count-up information is developed in the detection circuit of FIG. 3. Under these circumstances, the signal A leads the signal B by a phase angle 90°. The flip-flop FF1 is set in response to rising of the signal B under high level of the signal A. The flip-flop FF2 is set in response to the rising of the clock signal $\phi$ after the setting of the flip-flop FF1. The output of the flip-flop FF2 is introduced into the OR gate 50A to thereby provide the count-up signal X. The flip-flop FF2 is set and, simultaneously, the flip-flop FF1 is reset by the output of the flip-flop FF2. The flip-flop FF3 is set in response to the trailing edge of the signal B under the high level of the signal A. The flip-flop FF4 is set in response to the rising edge of the clock signal $\phi$ after setting of the flip-flop FF3. When the flip-flop FF4 is set, the flip-flop FF3 is reset by the output of the flip-flop FF4.

When the index arrow 26 extends inadvertently over the one angle defining side line, it is also necessary to permit the index arrow 26 to return back to that side line. When this occurs, the extensible tape member 20 must be pulled into the housing. Under these circumstances the count-down information is obtained through the photo sensors S1 and S2. The signal B leads the signal B by the phase angle 90° at that time. The flip-flops FF5 through FF8 are set and the count-down signal Y is developed as described with respect to FIG. 5(B).

The x 360 up/down counter 52 is responsive to the count-up signal X and the count-down signal Y and proceeds to increase or reduce counts thereof corresponding to the amounts of the angle. The x 10 Decimal up/down counter is also responsive to the count-up signal X and the count-down signal Y and proceeds to increase or reduce the counts thereof which is related to the amount of the extending length of the extensible tape member 10. Now, the switch 68 is turned to a P position which is coupled in the angle measurement mode. The display selector 64 is selected such that information stored in the x 360 up/down counter 52 is introduced into the driver 66. The display 24 visually indicates the angle information.

After the angle measurement is achieved, the switch 68 is turned to a Q position. The extensible tape member 20 is pulled out of the housing to be fitted to the object. The rotatory reel 22 is rotated in unison with the extension of the extensible tape member 20. The photo sensors S1 and S2 detect the rotation amount of the rotatory reel 22 to provide the counting signal for the detection circuit of FIG. 3. The count-up signal X and the count-down signal Y are developed by the detection circuit. Although the count-up signal X and the count-down signal Y are both introduced into the up/down counters 52 and 54, the information of the x 10 Decimal up/down counter 54 is only available. The output of the x 10 Decimal up/down counter 54 is entered into both the K-multiplier 56 and the squaring circuit 60. The L-multiplier 58 receives the output of the squaring circuit 60. The subtractor 62 functions to subtract the output of the L-multiplier 58 from the output of the K-multiplier 56.

The K-multiplier 56, the squaring circuit 60, the L-multiplier 58, and the subtractor 62 function to compensate for the rotation of the rotatory reel 22, because the rotation velocity of the rotatory reel 22 varies in accordance with the amount of the extensible tape member 20 remaining on the reel. The proper extending length S of the extensible tape member 20 is defined by the following equation.

$$S = Kn - Ln^2 \quad (1)$$

wherein n: the count of the x 10 up/down counter $$K = \frac{2\pi n}{m} \sqrt{r_o^2 + \frac{t_o l_o}{\pi}}, \quad L = \frac{\pi t_o}{m^2}$$

$r_o$: the radius of the shaft of the rotatory reel 22
$t_o$: the thickness of the extensible tape member 20
$l_o$: the total length of the extensible tape member 20
m: the interval of the adjacent two slits formed in the rotatory reel 22

The display selector 64 passes only the output of the subtractor 62 into the driver 66. Therefore, the amount of the length of the measured object is indicated on the display 24.

Figure 6:
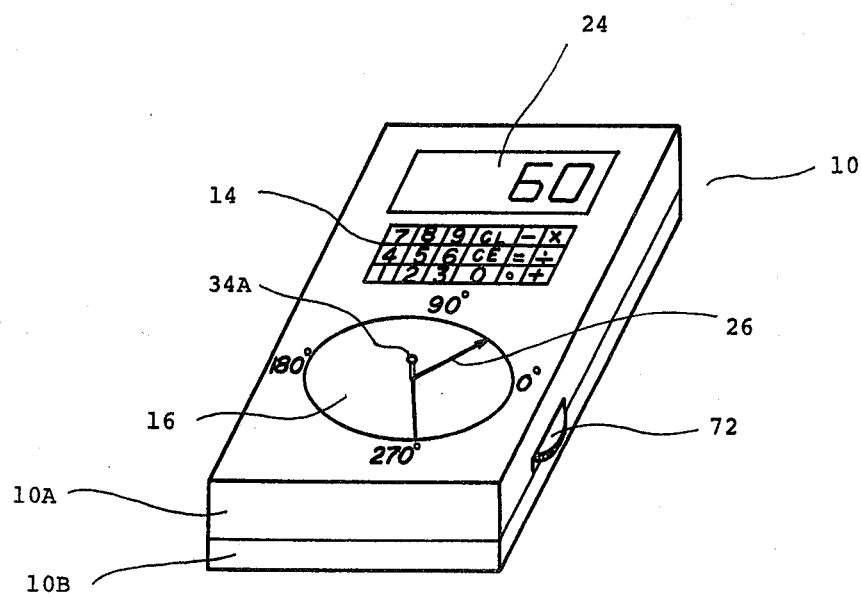
FIG. 6 is a perspective view of another embodiment of an electronic combined protractor and calculator of the present invention.
Figure 7:
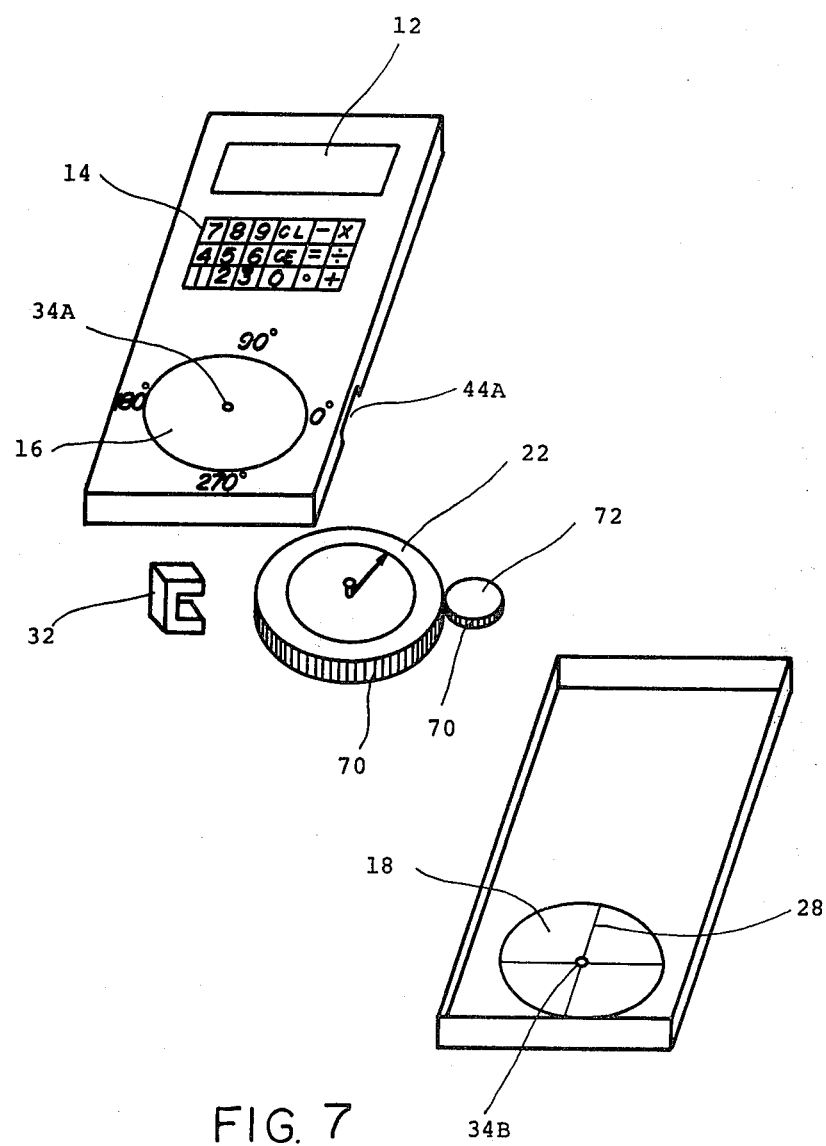
FIG. 7 is an exploded view of the electronic combined protractor and calculator shown in FIG. 6.

FIG. 6 shows another electronic combined protractor and calculator 10 of the present invention in a perspective view and FIG. 7 illustrates the same in an exploded view. Like elements corresponding to those of FIGS. 1 and 2 are indicated by like numerals.

A plurality of gears 70 are provided around the peripheries of the rotatory reel 22 and an activator 72 to engage tightly the activator with the rotatory reel 22. The activator 72 is rotated by the operator to rotate the index arrow 26 in measuring the angle since the end portion of the activator 72 is out of the housing. The rotation of the rotatory reel 22 is detected by the photo sensor 32 and the count-up signal X and the count-down signal Y as described in FIGS. 5(A) and 5(B) are developed through the use of the detection circuit of FIG. 3.

Figure 8:
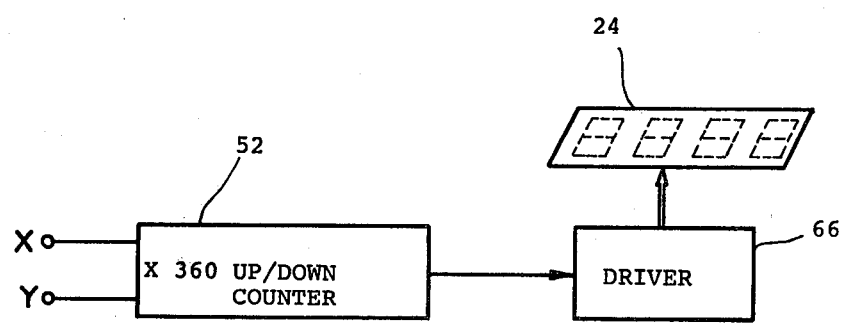
FIG. 8 is a block diagram of a control circuit employed within the electronic combined protractor and calculator of FIG. 6.

FIG. 8 shows the control circuit of the electronic combined protractor and calculator 10 shown in FIG. 6. Like elements to those of FIG. 4 are indicated by like numerals. The count-up signal X and the count-down signal Y are introduced into the x 360 up/down counter 52. The driver 66 receives the output of the up/down counter 52 to thereby provide the output thereof to the display 24. Therefore, the amount of the measured angle is indicated in the display 24.

It will be noted that the up/down counter 52 is not necessarily the x 360 counter as stated above. It is possible to measure an angle at a interval of one hundred eighty (180) degrees or ninety (90) degrees, if the up/down counter 52 is a x 180 up/down counter or a x 90 up/down counter. It is further apparent that a plurality of up/down counters may be provided and one of these counters may be selected through the use of a switch. Both radian and gradient are available for the unit of the angle measurement by a computation circuit coupled to the up/down counter 52, selection of either the radian or the gradient is operated by a key formed in the keyboard 14. The key further energizes the display 24 so that the unit of either the radian or the gradient are indicated in a lamp included within the display 24.

The invention being thus described, it will be obvious that the same may be varied in many ways. Such variations are not to be regarded as a departure from the spirit and scope of the invention, and all such modifications are intended to be included within the scope of the following claims.

What is claimed is:

1. An electronic combined protractor and scale comprising:

a housing;

an extensible member means coiled within said housing for attachment to an object to be measured;

two index means for respective alignment with the two sides of an angle to be measured, one of said two index means being arranged on the lower half of said housing;

a rotatory reel means for accommodating and storing said extensible member, said rotatory reel means fixedly supporting the other of said two index means in a frame thereof and having a plurality of slits therein;

a detector means responsive to rotation of said rotatory reel means for sensing the rotation of said rotatory reel means and for providing counting signals in response thereto; and a controller means for receiving said counting signals and for generating a plurality of control signals the number of control signals generated being proportional to the amount of rotation of the other of said two index means, said controller means further comprising an angle measure counter means for converting said counting signals into a first control signal indicative of angular measure and representing the number of degrees of said angle to be measured;

a decimal counter means for converting said counting signals to an intermediate control signal indicative of the length of said extensible member when pulled out from said housing;

compensation means responsive to said intermediate control signal for modifying said intermediate control signal to generate a second control signal, thereby compensating for the variation in rotational velocity of said rotatory reel means when said extensible member is pulled out from said housing, said second control signal representing the compensated true length of said extensible member when pulled out from said housing; and digital display means for displaying said first and second control signals, respectively.

2. The electronic combined protractor and scale as recited in claim 1, wherein both a shaft means of said rotatory reel means and a portion of said one of said two index means arranged on the lower half of said housing are made of transparent material.

3. The electronic combined protractor and scale as recited in claim 1, wherein said angle measure counter means and said decimal counter means comprises up/down counters, said angle measure up/down counters having radixes of three-hundred sixty (360) said decimal up/down counter having a radix of ten (10), wherein said compensation means for modifying said intermediate control signal to generate said second control signal further comprises:

a first multiplier means for multiplying said intermediate control signal by a first value, a squaring circuit for raising the count of said decimal up/down counter to a second power, a second multiplier for multiplying the output of the squaring circuit by a second value, a subtractor for subtracting the output of the second multiplier from the output of the first multiplier, and a selector means for switching between either the output of the angle measure up/down counter or the output of the subtractor.

4. The electronic combined protractor and scale as recited in claim 3, wherein said first value is defined as a function of the radius of said rotatory reel means, the total length and the thickness of said extensible member, and the interval between adjacent ones of said slits, said second value being defined as a function of the thickness of said extensible member and the interval between adjacent ones of said slits.

5. The electronic combined protractor and scale as recited in claim 3, further comprising a switch means for energizing said selector means to select either the output of said angle measure up/down counter or the output of said subtractor, said switch means being formed on the upper surface of said housing.

6. The electronic combined protractor and scale as recited in claim 3, wherein the controller means compensates for inaccuracies inherent in the intermediate control signal for indicating the true length of said extensible member pulled out from said housing by determining the proper length S of said extensible member in accordance with the following equation $$S = \frac{2\pi n^2}{m} \sqrt{r_o^2 + \frac{t_o l_o}{\pi}} - \frac{\pi t_o}{m^2} n^2$$

wherein n is the number of counts of the decimal up/down counter, m is the interval of adjacent ones of said slits, $r_o$ is the radius of the rotatory reel means, $t_o$ is the thickness of the extensible member, and $l_o$ is the total length of the extensible member.

7. The electronic combined protractor and scale as recited in claim 1, wherein the counting signals comprise:

a count-up signal and a count-down signal, the count-up signal being developed in response to forward rotation of the rotatory reel means by pulling-out of the extensible member from the housing, the count-down signal being developed in response to backward rotation of the rotatory reel by pulling-in of the extensible member into the housing.

8. The electronic combined protractor and scale as recited in claim 1, wherein a digital display is further provided for visually indicating the number of degrees of said angle to be measured the number of degrees being displayed in accordance with said first control signal.

9. An electronic combined protractor and scale and calculator comprising:

a housing;

an extensible member coiled within said housing for attachment to an object to be measured;

two index means for respective alignment with the two sides of an angle to be measured, one of the two index means being arranged on the lower half of said housing;

a rotatory reel means for accommodating and storing said extensible member, the rotatory reel means fixedly supporting the other of said two index means in a frame thereof said reel means having a plurality of slits formed peripherally thereon;

a detector means for sensing the rotation of said rotatory reel means and for generating counting signals in response to peripheral rotation of said slits on said rotatory reel means through said detector means;

a plurality of keys constituting a calculator keyboard formed on the surface of the housing;

a processor means for processing said counting signals in accordance with a switch formed with said plurality of keys thereby measuring the number of degrees constituting said angle to be measured and the length of said object to be measured said processor manipulating information introduced via numeral keys and command keys constituting said plurality of keys of said calculator keyboard, said processor means (compensating for the variation in rotational velocity) of said rotatory reel means when said extensible member is pulled out from said housing thereby generating a first and second set of control signals, said first set of control signals representing a true, compensated length of said extensible member when pulled out from said housing, said second set of control signals representing the number of degrees of an angle to be measured; and digital display means for displaying said first and second set of control signals, respectively.

10. The electronic combined protractor and scale and calculator as recited in claim 9, wherein both a shaft means of the rotatory reel means and a portion of the lower half of said housing where said one of the two index means is arranged are made of transparent material.

11. The electronic combined protractor and scale and calculator as recited in claim 9, wherein the processor means comprises:

up/down counters having radixes of three-hundred sixty (360) and ten (10), respectively, said up/down counter having said radix of ten (10) being a decimal counter;

a first multiplier means for multiplying the count of the decimal counter by a first value, a squaring circuit means for raising the count of the decimal counter to second power, a second multiplier means for multiplying the output of the squaring circuit means by a second value, a subtractor means for subtracting the output of said second multiplier means from the output of the first multiplier means, and a selector means for switching to display on said display means the output of said up/down counter having the three-hundred sixty (360) radix and the output of the subtractor means.

12. The electronic combined protractor and scale and calculator as recited in claim 11, wherein said first value is defined as a function of the radius of said rotatory reel means, the total length and the thickness of the extensible member, and the interval of adjacent ones of said slits, the second value being defined as a function of the thickness of said extensible member and the interval of adjacent ones of said slits.

13. The electronic combined protractor and scale and calculator as recited in claim 11, wherein said selector means comprises a switch means, said switch means energizing said selector means thereby selecting the output of said up/down counter having the three hundred sixty (360) radix and the output of the subtractor means.

14. The electronic combined protractor and scale and calculator as recited in claim 11, wherein said processor means compensates for inaccuracies present within said counting signals relative to the true length of said extensible member when pulled out from said housing thereby determining the proper extending length S of said extensible member when pulled out from said housing in accordance with the following equation:

$$S = \frac{2\pi n^2}{m} \sqrt{r_o2 + \frac{t_o l_o}{\pi}} - \frac{\pi t_o}{m^2} n^2$$

wherein n represents the number of counts of the decimal up/down counter, m is the interval between adjacent one of said slits, $r_o$ is the radius of the rotatory reel means, $t_o$ is the thickness of the extensible member, and $l_o$ is the total length of the extensible member.

15. The electronic combined protractor and scale and calculator as recited in claim 9, wherein said counting signals comprise a count-up signal and a count-down signal, the count-up signal being developed in response to forward rotation of the rotatory reel means by pulling-out of the extensible member from the housing and count-down signal being developed in response to backward rotation of the rotatory reel means by pulling-in of the extensible member into the housing.

16. An electronic combined protractor and calculator comprising:
a housing;
two indexes provided for respectively crossing with two sides defining an angle to be measured, one of the two indexes being formed on the lower half of the housing;
a rotary reel fixedly supporting the other of the indexes in a frame thereof and having a plurality of slits therein;
an actuator for driving the rotatory reel to rotate the other of said indexes;
a detector for sensing rotation of the rotatory reel and for providing signals through the use of said slits;
a plurality of keys formed on the surface of the housing;
a processor means for manipulating said signals in accordance with a switch formed within the keys to measure the degrees of a measured object and for manipulating information introduced through the use of a set of numeral keys included within said keys in response to commands by a set of command keys included within said keys, said processor means including up/down counters having radixes of three-hundred sixty (360) and of ten (10) and responsive to said signals, said radix ten (10) up/down counter being a decimal counter;
a first multiplier for multiplying the count of said decimal counter by a first value;
a squaring circuit means for raising the count of said decimal counter to a second power;
a second multiplier means for multiplying the output of said squaring circuit means by a second value;
a subtractor means for subtracting the output of the second multiplier means from the output of the first multiplier, and a selector means for switching to receive the output of the up/down counter having the three-hundred sixty (360) radix and the output of the subtractor.

17. The electronic combined protractor and calculator recited in claim 16 wherein said actuator comprises:
an extensible member stored in said rotatory reel, said first value being defined as a function of the radius of said rotatory reel, the total length and the thickness of said extensible member, and the interval between adjacent ones of said slits, said second value being defined as a function of the thickness of said extensible member and the interval between adjacent ones of said slits.

18. The electronic combined protractor and calculator recited in claim 17 further comprising:
a switch means included with said keys for energizing said selector means thereby selecting the output of the up/down counter having the three-hundred sixty (360) radix and the output of the subtractor means for display purposes, said switch means being formed on the upper surface of said housing.

19. The electronic combined protractor and calculator as recited in claim 16 wherein said actuator comprises:
an extensible member, said processor compensating for said signals to determine the proper extending length S of said extensible member to be stored in the rotatory reel in accordance with the following equation:

$$S = \frac{2\pi n^2}{m} \sqrt{r_o2 + \frac{t_o l_o}{\pi}} - \frac{\pi t_o}{m^2} n^2$$

wherein n is the count of said decimal up/down counter, m is the interval of adjacent slits, $r_o$ is the radius of said rotatory reel, $t_o$ is the thickness of the extensible member, and $l_o$ is the total length of said extensible member.

20. The electronic combined protractor and calculator as recited in claim 16, wherein both a shaft means of said rotatory reel and a portion of the lower half of said housing where said one of the two indexes is arranged are made of transparent material.

21. The electronic combined protractor and calculator as recited in claim 16, wherein said actuator comprises an extensible member stored in the rotatory reel the signals comprising a count-up signal and a count-down signal, the count-up signal being developed in response to forward rotation of the rotatory reel by pulling-out of the extensible member from the housing, the count-down signal being developed in response to backward rotation of the rotatory reel by pulling-in of the extensible member into the housing.

22. The electronic combined protractor and calculator as recited in claim 16, wherein a digital display is further provided for visually indicating the number of degrees of the angle to be measured the number of degrees of said angle being displayed in accordance with a signal from the output of said processor.

23. The electronic combined protractor and calculator as recited in claim 16, wherein the rotatory reel comprises a spur wheel the actuator comprising a second spur wheel, said spur wheel and said second spur wheel being engaged with each other.

* * * * *